N. SCHACHTER.
SHOCK ABSORBER.
APPLICATION FILED JAN. 8, 1917.
1,307,835.
Patented June 24, 1919.
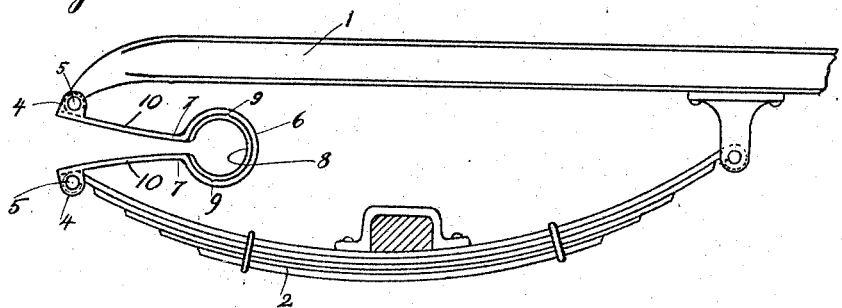
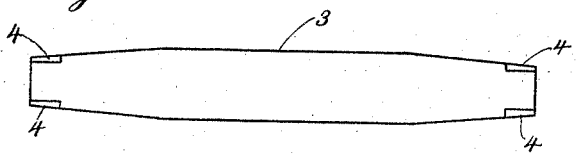
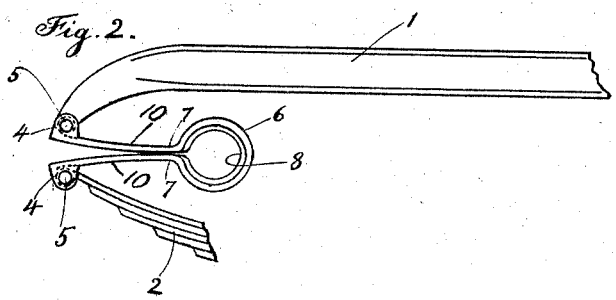
WITNESSES:
INVENTOR.
NATHAN SCHACHTER.
BY
HIS ATTORNEY.

UNITED STATES PATENT OFFICE.

NATHAN SCHACHTER, OF CHICAGO, ILLINOIS.

SHOCK-ABSORBER.

1,307,835.　　　　　　Specification of Letters Patent.　　Patented June 24, 1919.

Application filed January 8, 1917. Serial No. 141,303.

*To all whom it may concern:*

Be it known that I, NATHAN SCHACHTER, a citizen of the United States, and a resident of the city of Chicago, county of Cook, and State of Illinois, have invented certain new and useful Improvements in Shock-Absorbers, of which the following is a specification.

My invention relates to improvements in shock absorbers, and has for its object the production of a device of this character, through the medium of which the shock and jars incident to the travel of a vehicle over a rough roadway will be effectually absorbed and prevented from being transferred to the body of the vehicle.

A further object is the production of a shock absorber, as mentioned, which will be of extremely simple construction and which may be readily and easily applied.

A further object of the invention is to provide a shock absorber wherein the parts thereof are suitably proportioned and coöperatively arranged so as to offer a more gradual uniformly increasing resistance than in previous structures and which will effectively absorb shock or jar.

A further object of the invention is to provide a shock absorber having resilient diverging arms adapted to engage primarily at their inner ends and progressively nearer to the outer ends, and having the arms tapered from their inner to their outer ends so as to regulate the resistance so as to more gradually and easily absorb the shock than in previous structures.

A further object of the invention is to provide a shock absorber spring with a circular portion and a pair of longitudinally curved diverging arms connected thereto, and a reinforcing member for the circular portion which is retained in place by interengaging parts on the reinforcing member and the circular portion.

My invention also has other objects which will appear from the following specification and the accompanying drawings.

The invention consists in the combinations and arrangements of parts hereinafter described and claimed.

The invention will be best understood by reference to the accompanying drawings forming a part of this specification, and in which, Figure 1 is a fragmental sectional side elevation of one end of a conventional vehicle frame, in connection with which is shown a shock absorber, embodying the invention, Fig. 2, a view similar to Fig. 1 showing the action of the shock absorber in the case of excessive jarring of the wheels of the vehicle, and Fig. 3, a top plan view of the blank from which the body of the shock absorber is formed.

The preferred form of construction, as illustrated in the drawings, is designed for use especially in connection with a vehicle embodying frame bars 1 and leaf springs 2, such as is the construction of conventional automobiles, although it is not limited to such use.

The shock absorber is designed for insertion between the adjacent ends of the frame 1 and the spring 2, which, when the vehicle is in use, are adapted for relative vertical movement.

The shock absorber spring is made from a single piece of spring metal 3, which as shown is comparatively wide, and tapered at each end, and bent centrally upon itself so as to form a comparatively large circular or cylindrical hinge 6, having the two arms 10, which diverge outwardly from the hinge 6, and have the perforated ears 4, at their outer ends for the accommodation of bolts or pins 5, whereby the arms are connected with the ends of frame member 1, and spring 2.

The arms 10, are formed from the tapered ends of the blank 3, and the inner wide ends 7, thereof are spaced close together so as to permit contraction which is limited by engagement of the inner ends 7, of the arm 10. These arms diverge from the ends 7, to the outer ends as previously stated so that the outer ends are separated a greater distance than the inner ends 7, and said arms are curved longitudinally so as to have spaced convex surfaces so related that after the inner ends 7, contact and as the outer ends are brought closer together, the inner convex surfaces of the arms progressively engage closer to the outer ends thereby diminishing the leverage of the arms and thus increasing the resistance they offer to further contraction.

If the arms are of uniform width or strength from the inner ends to the outer ends the resistance increases rapidly and the shock is abruptly resisted, and the spring does not have the desired effectiveness to gradually and easily absorb the shock or jar. In order to give the spring the greater desired resilience, the arms are tapered outwardly so that the strength thereof is gradually diminished toward the outer ends and this has the effect as the point of contact approaches the outer ends and the length of leverage is accordingly diminished to enable the separated portions of the arms to retain a degree of resiliency which will gradually and easily absorb the shock or jar, and which they would not have were the arms of uniform width or strength from the inner ends 7, to the outer ends.

With this arrangement, it will be seen that the device constitutes an exceedingly resilient support or connection between the adjacent ends of frame 1 and spring 2. In case of minor irregularities in the road or limited approach of the ends or arms of the shock absorber, the flexing will proceed from the circularly formed bight portion 6. In the event, however, of excessive jarring and therefore excessive flexing of the shock absorber, the portions 7 will be brought together, in which case, therefore, the flexing of the ends or arms of the shock absorber will proceed from the points 7 as the fulcrum for the flexing action. The resilience of the spring will be comparatively light, normally, that is the same will have a maximum flexibility when the points 7 are separated. In case of excessive jarring, however, or at the times when the points 7 are brought together, the resilience of the shock absorber will be gradually increased as the outer ends of the arms 10, continue to approach, and thus the capacity or capability of the device to absorb the excessive jarring will be automatically and gradually increased as occasion requires. In order to increase the tension of the spring, a supplemental reinforcing member 8 may be employed which may be inserted in the portion 6. The member 8 will be held in position by means of lips 9 which may be punched therefrom to engage with the opposite sides of the portion 6.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with two relatively movable vehicle parts, of a shock absorbing spring connecting said parts and consisting of a plate spring having the circular bight portion 6 and the diverging longitudinally curved tapered arm 10 arranged and proportioned substantially as shown and described.

2. A shock absorbing spring comprising a resilient loop, a pair of longitudinally curved and tapered arms connected at the enlarged ends with and diverging from the loop, said arms being provided with normally separated parts at their enlarged ends adjacent the loop adapted to permit limited contraction of the resilient loop and be inter-engaged by approximation of the outer reduced ends of the arms, and attaching means at the outer end of each arm.

3. A shock absorbing spring comprising a longitudinal plate spring tapered at each end and folded upon itself intermediate of its ends to form a cylindrical resilient hinge having tapered arms curving and diverging outwardly therefrom, said arms having the wide portions thereof adjacent the hinge and normally spaced to permit limited contraction of the resilient hinge and be inter-engaged by approximation of the outer narrow ends of the arm.

4. A shock absorbing spring comprising a longitudinal plate spring tapered at each end and folded upon itself intermediate of its ends so as to provide a cylindrical loop having normally spaced longitudinally curved diverging tapered arms adapted to initially engage adjacent the hinge loop, and to progressively engage closer to the free ends thereof as the arms are brought closer together, said arms being suitably tapered from the point of initial contact to the outer ends so as to gradually decrease the strength of the arms from the inner ends to the outer ends thereof.

5. A shock absorbing spring comprising a pair of longitudinally curved outwardly diverging and tapered spring plate arms, an elongated resilient cylindrical loop integral with and connecting the wide inner ends of the arms, said arms being normally spaced at their inner ends to permit contraction of the loop and adapted to progressively engage closer to the outer ends thereof as said arms are brought closer together.

In testimony whereof I have signed my name to this specification in the presence of two subscribing witnesses.

NATHAN SCHACHTER.

Witnesses:
JOSHUA R. H. POTTS,
HELEN F. LILLIS.